Patented July 28, 1931

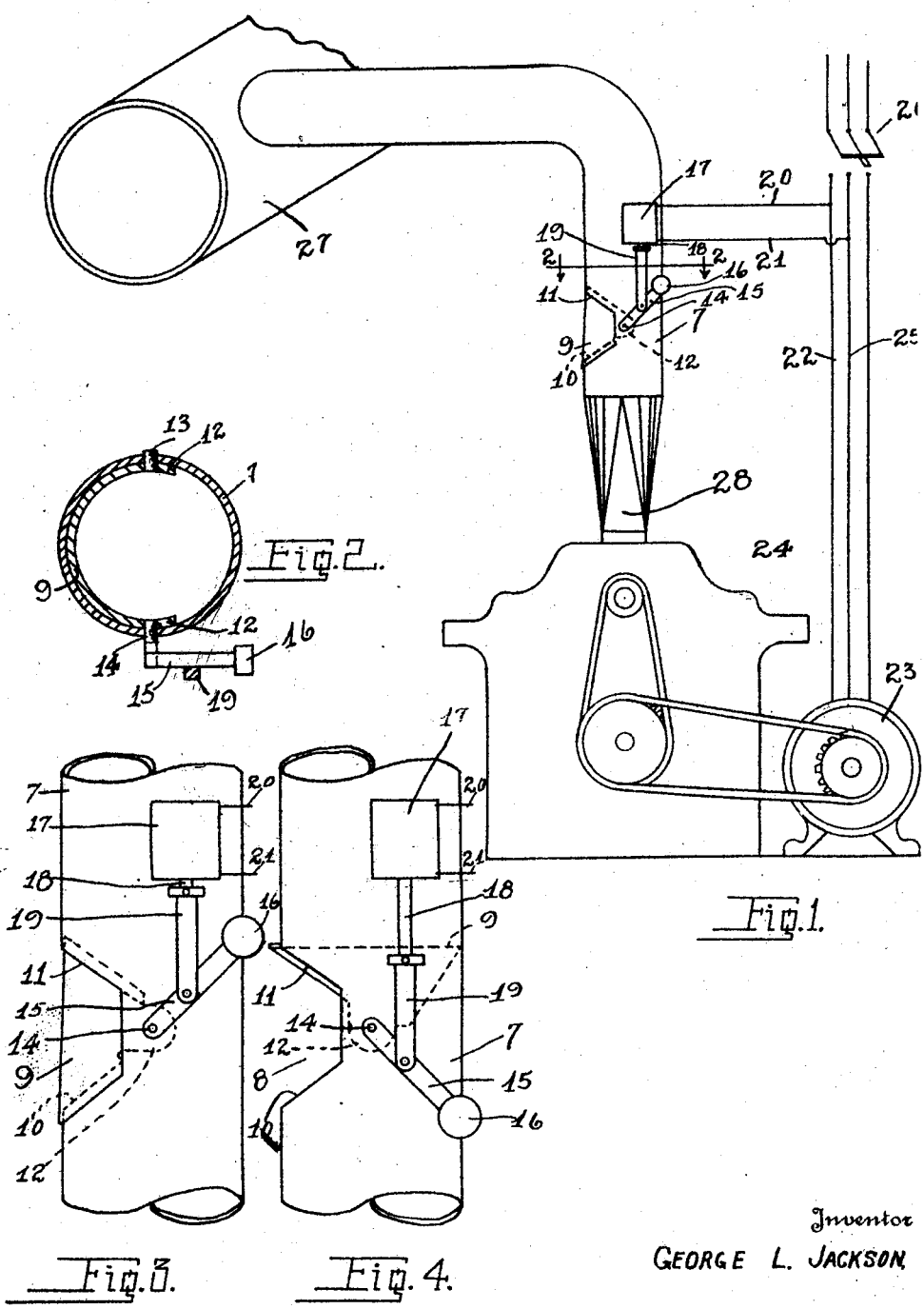

1,816,223

UNITED STATES PATENT OFFICE

GEORGE L. JACKSON, OF LOUISVILLE, KENTUCKY, ASSIGNOR TO THE KIRK & BLUM MANUFACTURING COMPANY, OF CINCINNATI, OHIO, A CORPORATION OF OHIO

AUTOMATIC CUT-OFF

Application filed November 28, 1927. Serial No. 236,307.

This invention relates to an automatic cut-off for suction pipes in dust collecting systems and the like and has for its object the provision of a simple, efficient and inexpensive device the use of which serves to effect a great saving in power for maintaining suction in the system.

Another object is to provide an automatic cut-off for an individual suction pipe of a system wherein said suction pipe leads to an individual motor driven waste producing machine.

Another object is to provide a device of this kind which effectively closes the individual suction pipe when the machine is inoperative thereby reducing the power necessary to maintain the proper exhaust of air in the system.

These and other objects are attained by the means described herein and disclosed in the accompanying drawings, in which:

Fig. 1 is an outline elevational view of a motor driven waste producing machine having a suction hood and suction pipe in which there is embodied an automatic cut-off of the invention.

Fig. 2 is a view taken on line 2—2 of Fig. 1.

Fig. 3 is an enlarged fragmental view showing the cut-off valve in open position.

Fig. 4 is a view similar to Fig. 3 but showing the valve in closed position.

The cut-off valve of the invention is adapted to be mounted in a section of individual suction pipe in a system or in a separate sleeve 7 having cut in its side wall an opening 8, the area of which approximates in size and shape of the cross section of the pipe or sleeve 7. A valve member 9 has a body adapted when in one position to close the opening and to overlap the bottom edge 10 thereof on the exterior of the pipe 7 while its top overlaps the top edge 11 of the opening interiorly of the pipe. The body 9 has a pair of projecting perforate ears 12 extending through the opening into the pipe and pivotally connected thereto by trunnions 13 and 14. The trunnion 14 is elongated and projects outwardly for a distance beyond the body of the pipe where it has secured to it a crank arm 15 having a counter-weight 16 on the end thereof. The ear 12 of the valve which is disposed interiorly of the pipe and secured to the trunnion 14 is likewise rigidly secured to the opposite end of the trunnion 14 so that the counter-weight 16 normally pulls the crank 15 downwardly in the position shown in Fig. 4 and moves the valve body 9 through an arc and disposes it transversely of the pipe completely blocking the interior thereof and to shut off suction in the pipe above the valve. Suitably secured to the pipe 7 is a solenoid 17 having a reciprocating armature 18. A connecting link 19 is pivotally connected at its one end to the outer end of the armature 18 and at its other end to the crank 15 intermediate the ends thereof. The wires 20 and 21 from the opposite ends of the coil of the solenoid or electromagnet 17 are adapted to be connected in parallel with wires 22 and 25, which represent one phase in a power circuit embracing an electric motor 23 for driving the waste production machine 24, with which the pipe 7 is associated. The motor starting switch or compensator 26 is used for starting and stopping the motor 23, and also controls the electromagnet or solenoid 17. From the foregoing it will be apparent that whenever the power circuit 22—25 to the motor is open the solenoid is de-energized, and the valve 9 is in a closed position as shown in Figure 4. When the switch 26 is closed the motor 23 starts the machine 24 and at the same instant draws the armature 18 upwardly within itself, raising the crank 15 and moving the valve body 9 about its pivotal mounting to the position shown in Figs. 1 and 3 for closing the opening 8, thus permitting suction in the pipe 7 and its associated pipe 27 in the system to become effective below the valve and the hood 28 over the machine. Inasmuch as many types of waste producing machines such as planers, saws and the like are used only for short and widely spaced intervals of time, it will be apparent that the power necessary to maintain suction in the pipe 27 is lessened by blocking or closing the individual pipes 7 when their associated waste producing machines are at rest. The valve and crank arm are arranged for easy movement about the pivotal mounting so that a very small excess counter-weight is required for again actuating the valve to block the pipe 7 when the solenoid is deenergized upon breaking of the motor circuit 22—25. In plants having many intermittently used machines, the installation of valves of this invention in the individual suction pipes effects a great saving of power.

While there is illustrated herein but one practical embodiment of the invention it will be readily understood that modifications may be had within the spirit and scope of this invention and the appended claims. For example the aperture at the side of the pipe provides an easy and inexpensive method of construction to permit movement of the cut-off valve plate shown. This aperture may be covered by a cap or dome without interfering with the operation of the valve. Furthermore any type of valve which is adapted to be actuated by a suitable solenoid during the operation of the machine to provide communication between a dust collecting system and the machine and which automatically closes the pipe when the solenoid is de-energized on shutting down of the machine. Also any of the well known revolving type of solenoids may be arranged for direct communication with the axis of a cut-off valve for actuation by an electric circuit through an arc of 90 degrees for effecting the same movement of the valve.

It will be noted that the opening of the cut-off valve to permit suction in the dust collecting system to become effective at the individual waste producing machine upon actuation of the control means for the machine in setting it into operation and shutting it down. Any actuating means for controlling the power source for the waste producing machine may be arranged to automatically make and break the electric circuit to the electro magnet for accomplishing this co-operative relation between the machine and the dust collecting system.

What is claimed is:

1. In combination with a dust collecting system comprising an individual suction pipe, an electric motor driven machine associated with the pipe, an orificed sleeve in the pipe, a crank actuated valve adapted for movement to alternately close the orifice and the passage through the pipe, an electromagnet adapted to move the crank to close the orifice with the valve and an electric circuit embracing the motor and electromagnet.

2. In combination a dust collecting system, an electric motor driven mechanism, a suction pipe connecting the mechanism and system, an electromagnet, a valve in the pipe, a weighted crank normally retaining the valve in a position to cut off suction between the system and the mechanism, means operated by the electromagnet for actuating the crank to open the pipe and an electric circuit embracing the electric motor and the electromagnet whereby the parts automatically assume the last mentioned position when the circuit is closed for actuating the said mechanism.

3. In combination a machine, an electric motor for operating said machine, a dust collecting system, a suction pipe extending from the system to the machine and an electromagnetically operated valve in the pipe connected in parallel with the motor whereby the valve is closed when the motor is at rest and the valve is opened when the motor is energized.

4. In combination a dust collecting system, an electric motor driven mechanism, a suction pipe connecting the mechanism and system, a valve in the pipe, said pipe having an orifice in its side wall permitting access to the valve, an electromagnet disposed adjacent said orifice, a weighted crank normally retaining the valve in a position to cut off suction between the system and the mechanism when the orifice is open, means operated by the electromagnet for actuating the crank to open the pipe and close the orifice and an electric circuit embracing the electric motor and the electromagnet whereby the parts automatically assume the last mentioned position when the circuit is closed for actuating the said mechanism.

5. In combination a power driven machine, control means for starting and stopping the machine, a dust collecting system, a suction pipe extending from said system to the machine and an electromagnetically operated valve in the pipe controlling communication between the system and the machine, the control means for the machine being arranged to make and break the electric circuit to said electro-magnetically operated valve upon actuation thereof for starting and stopping the machine.

6. In combination, a dust-collecting system, a machine and driving means therefor, a suction pipe communicating with the system and the machine, a valve normally sealing the passage through the pipe and means opening the valve upon operation of the driving means.

7. The combination with a dust-collecting system, of a machine and driving means therefor, a suction pipe communicating with the system and the machine, a pivotally-mounted valve in the pipe normally closing the passage through the pipe said pipe being provided with an aperture permitting access to the valve, and means operative upon actuation of said driving means for moving the valve about its pivotal mounting whereby to close said aperture and open the passage through the pipe.

In testimony whereof, I have hereunto subscribed my name this fourteenth day of November, 1927.

GEORGE L. JACKSON.